United States Patent
Hall

(10) Patent No.: US 6,404,838 B1
(45) Date of Patent: Jun. 11, 2002

(54) MEASURING SPOON

(75) Inventor: Kirsty Hall, Dollar (GB)

(73) Assignee: Kennedy & Co, Glasgow (GB)

( * ) Notice: Subject to any disclaimer, the term of this patent is extended or adjusted under 35 U.S.C. 154(b) by 0 days.

(21) Appl. No.: 09/519,483

(22) Filed: Mar. 6, 2000

(30) Foreign Application Priority Data

Mar. 6, 1999 (GB) .............................................. 9905097

(51) Int. Cl.[7] ................................................. G07C 3/00
(52) U.S. Cl. ............................. 377/16; 377/15; 222/23; 222/33; 222/41; 235/103
(58) Field of Search ............................. 222/41, 47, 49, 222/39, 33, 23; 235/103; 372/15, 16

(56) References Cited

U.S. PATENT DOCUMENTS 4,188,984 A * 2/1980 Lyall ........................... 141/12
5,299,356 A * 4/1994 Maxwell, III ............... 377/112

FOREIGN PATENT DOCUMENTS

GB 2331979 A 12/1998

* cited by examiner

*Primary Examiner*—Margaret R. Wambach
(74) *Attorney, Agent, or Firm*—Kohn & Associates

(57) ABSTRACT

A dispensing device for dispensing powder foods or liquids has a scoop for containing the powder or liquid, and levelling means for levelling off the scoop contents, wherein the levelling means co-operates with a counter such that operation of the levelling means is adapted to advance the counter, the counter being characterised in that the counter may be reset to zero in a single step process.

12 Claims, 3 Drawing Sheets

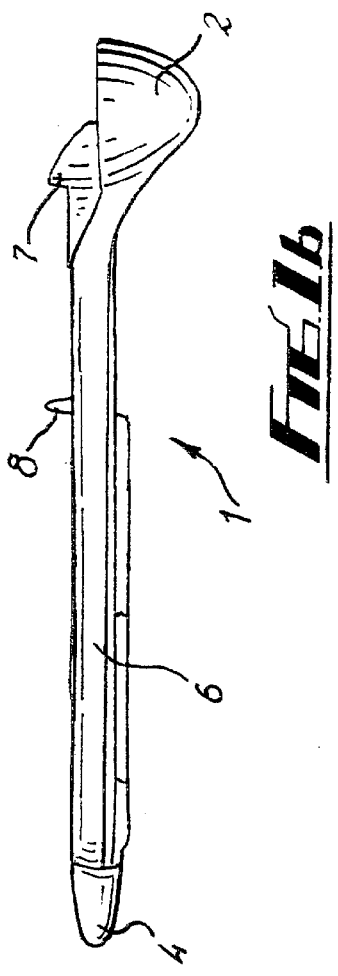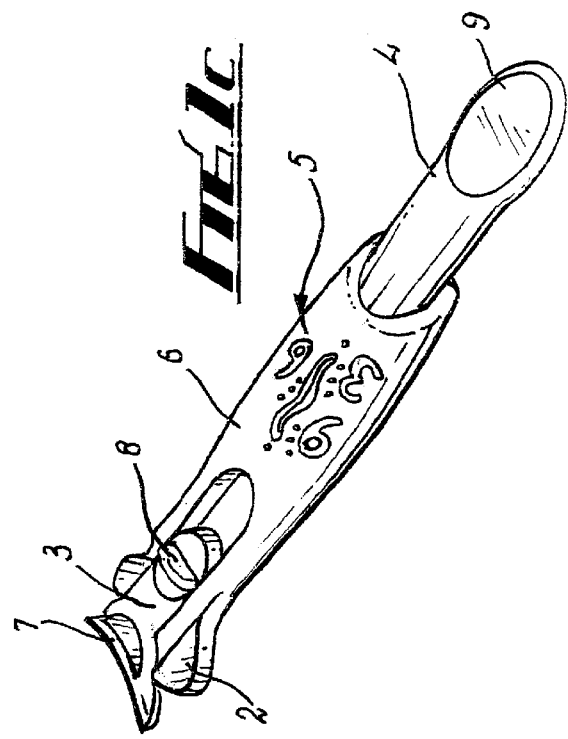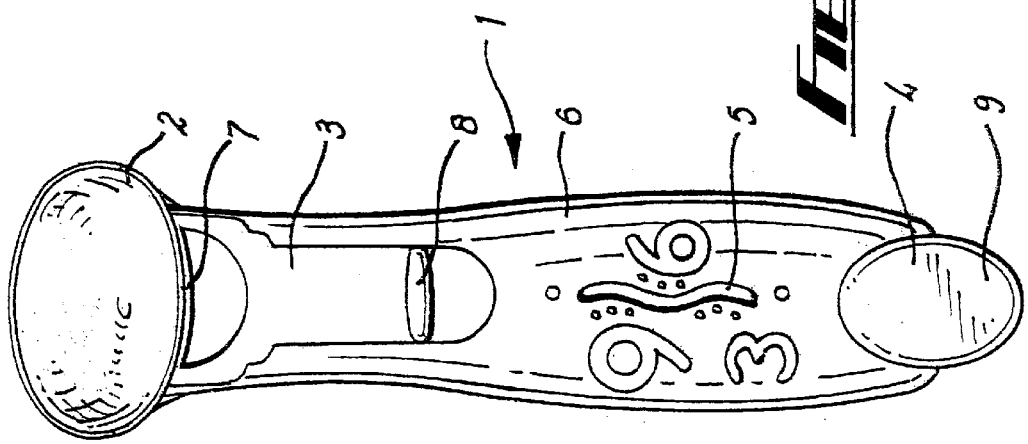

MEASURING SPOON

BACKGROUND OF THE INVENTION

1. Field of the Invention

This invention relates to a dispensing device, especially but not exclusively for use with powdered food.

2. Background Art

The use of powdered food and drink is very common. The majority of food and beverages can be dried or otherwise provided in powdered form and one common example is found in baby products, particularly baby milk. In respect of such an example, the need for careful measurement of the powder relative to the quantity of fluid to be added to the powder is critical, as babies and young children are typically sensitive to inconsistencies in the density of their diet. It is also advantageous, for practical reasons, to provide a correct balance between the powder and water or other liquid to enable the powder to properly dissolve in the liquid, without dry lumps remaining in the mixture.

Currently, many packets of powdered food supply a spoon for measuring the quantity of powder to be used. However, typically the spoon is relatively non-distinct and easily lost or misplaced. Thus, where powdered food containers are of a size intended to be used on several occasions, often the spoon does not remain readily available throughout the life of the powdered food product.

A further problem with most spoons is that they are not provided with means for ensuring that the measured amount is consistent each time the spoon is used. The difference between a heaped spoonful and a flattened spoonful can be significant.

In an effort to provide a solution to this problem, UK Patent Application Number GB 2, 331, 979 describes a dispensing spoon with a slideable lid adapted to cover the spoon, such that any powder supported on the spoon is levelled. However, while this design prevents a maximum load from being exceeded, the lid impedes a user's view to the extent that one cannot determine whether the spoon has been filled under the lid. A further disadvantage of employing a flat lid of the type taught by this earlier British Application is that the lid tends to slice through any heaped powder but not necessarily remove it altogether from the spoon. In fact, the flat or planar shape of the lid can result in the excess powder resting on the top of the lid and may lead to it becoming reunited with the powder in the hollow of the spoon when the powder is dispensed.

Thus, one object of the present invention is to provide a dispensing spoon that is adapted to dispense consistent volumes of powder or other food or liquid.

A further problem with known spoons is that generally they are not adapted to count or indicate the number of spoonfuls dispensed. In relation to babies' milk, it is not uncommon for several spoonfuls of powder to be required. If a mother is distracted during food preparation, for example by a telephone call or in order to attend a child, it is possible that the amount of food already dispensed could be forgotten leading to inaccuracies or wastage.

Again, dispensing spoons have been designed in an attempt to provide a count indicator, but inevitably in the past they have not been entirely practical. It is recognised in the present invention that a user should be able to reset any counter means with minimal effort. For example, returning the counter to zero should not be a multi-step task.

Also, it is an object of the present invention to provide a counting mechanism that is readily cleaned to the extent of sterilisation where appropriate. Preferably, this requires there to be resistance to the infiltration of powder in the mechanism.

SUMMARY OF THE INVENTION

According to the present invention there is provided a dispensing device for dispensing powder foods or liquids comprising a main body portion, a scoop for containing the powder or liquid, levelling means for levelling off the scoop contents, wherein the levelling means co-operates with a counter such that operation of the levelling means is adapted to advance the counter, wherein the counter includes a visual display of a count taken by the counter, characterised in that the counter may be reset to zero in a single step process.

Typically the single step process may involve a single linear movement of part of the counter.

Preferably, the counter comprises a resetting arm that may be extended from the body of the device, wherein said extending of the arm serves to reset the counter to zero.

Preferably the levelling means comprises an elongate member having a grip or handle at or near one end thereof and a levelling member toward an other end thereof, wherein the levelling means may be moved in a first direction toward the scoop so as to present the levelling member to the contents of the scoop to level said contents, and wherein the levelling means may be moved in a second direction to return the levelling member to a position where it does not obstruct the scoop, and wherein said movement of the levelling means in one of the said first or second direction co-operates with a mechanism to advance the counter, and wherein said movement in the other of the said first or second direction does not advance the counter.

Preferably the levelling member is shaped so as to present a face to the contents of the scoop in excess of a predetermined amount, whereby the movement of the face is adapted to push the excess contents away from the scoop.

The mechanism for advancing the counter preferably includes a ratchet.

The visual display of the count may be provided as a two dimensional scale.

Preferably, the distance moved by the levelling means to perform a levelling function in respect of the scoop is greater than the distance of the movement of the visual display apparatus when advancing by a single unit.

The levelling member may be adapted to cover the scoop and may have a means for sealingly engaging an upper rim of the scoop for use when dispensing liquids.

Preferably the device may be dismantled and reassembled to aid in cleaning requirements.

The visual display of the count might advantageously be positioned for viewing from an upper side of the device, wherein said upper side is defined by the open side of the scoop.

BRIEF DESCRIPTION OF THE DRAWINGS

In order to better provide a better understanding of the invention, various embodiments will now be described, by way of example only, with reference to the accompanying Figures, in which:

FIGS. 1a, 1b and 1c depict respective top, side and perspective views of a dispensing device in accordance with the invention;

DETAILED DESCRIPTION OF THE PREFERRED EMBODIMENTS

Figure 2:
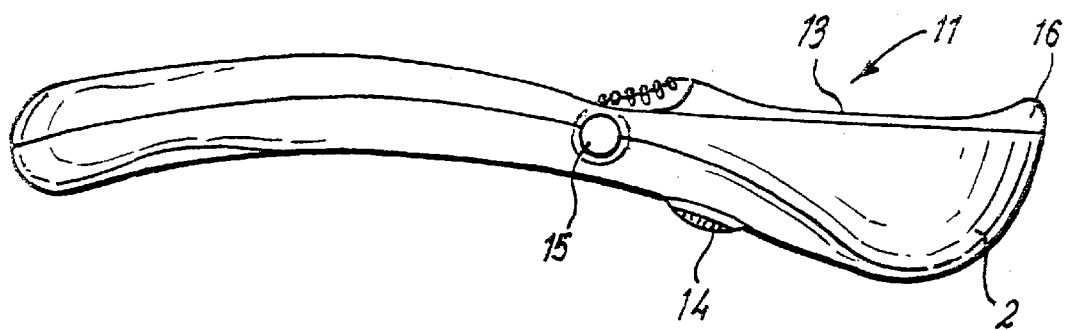
FIG. 2 illustrates a side-view of an alternative measuring device.

Referring firstly to FIG. 1, a dispensing device suitable for dispensing powder foods or liquids is generally depicted at 1. The device comprises a scoop 2, a levelling means 3 and a counting mechanism having a resetting arm 4 and a visual display means in the form of a scale 5.

Both the levelling means 3 and the counter resetting arm 4 may be extended axially from the body 6 of the device 1. The levelling means 3 is formed with an active levelling member 7 at its functional end. The levelling member, in this example embodiment, is provided as a shovel which serves to push through any excess content in the scoop 2 that sits proud of the upper rim of the scoop 2. While it is appreciated that the levelling member may be formed in a variety of ways or shapes, it is also recognised herein that it is advantageous to present a face to the excess contents, rather than merely and edge, as this will assist in enabling a more complete removal of the excess scoop contents, whereas an edge might less desirably only slice through the excess contents. The shape of the levelling member in this example embodiment may be noted more clearly from FIG. 1b.

The levelling means 3 may also be provided with a grip or handle 8. The grip 8 need only be formed as a ridge that presents itself ergonomically in a manner that is operable by a user's thumb.

The counter includes a resetting arm slideable within the body. The resetting arm also has a grip 9 which remains outwith the body 6, thereby remaining accessible to a user. Resetting of the counter to zero is achieved by the simple extension of the resetting arm 4.

A two dimensional linear scale is presented on an upper side of the body 6, providing a visual display of the number of scoops that have been made between the resetting of the counter. More specifically, the counter records the number of scoops that have been levelled by the levelling means 3.

In FIG. 1c the dispensing device of FIGS. 1a and 1b are illustrated with both the levelling means 3 and the resetting arm 4 partially extended.

The example dispensing device illustrated in FIG. 1 may be used in the following way. The resetting arm 4 is extended until the scale is at zero. The scoop is used to spoon up contents, and typically this will be in the form of powdered food. Then, the levelling means 3 may be extended by pushing on the grip 8 until the levelling member 7 pushes excess contents from above the upper rim of the scoop 2. As the levelling means 3 is extended a ratchet causes the resetting arm 4 to retract into the body 6 by an amount contrived to advance the scale reading by a single unit. Once the excess powder or other contents has been removed, the levelling means 3 is returned to its original position and, by reason of the ratchet, this return action does not alter the position of the counter mechanism or resetting arm 4. The measured contents may now be emptied from the scoop 2. The process may then be repeated to measure further quantities of food or liquid, with each scoop being counted by the co-operation of the levelling means with the counter.

Cleaning is also simplified by the ability of the resetting arm 4 and levelling means 3 to be removed from the body 6. This is particularly important when sterilisation is desired, such as when the device is used with infants.

It should be appreciated that this embodiment of the invention presents a notable advantage over prior teachings of such devices which have sought to use wheel dials to display the count recorded. These wheels have been larger than that which might otherwise be practical or desirable, as the size of the wheel has been dictated by the need for its rotation to correspond with the distance of movement of a levelling arm. By using a two dimensional scale and by imposing a ratchet or similar mechanism between the visual display mechanism and the levelling means, the present invention allows for a far improved device in terms of style and ergonomics.

Figure 3:
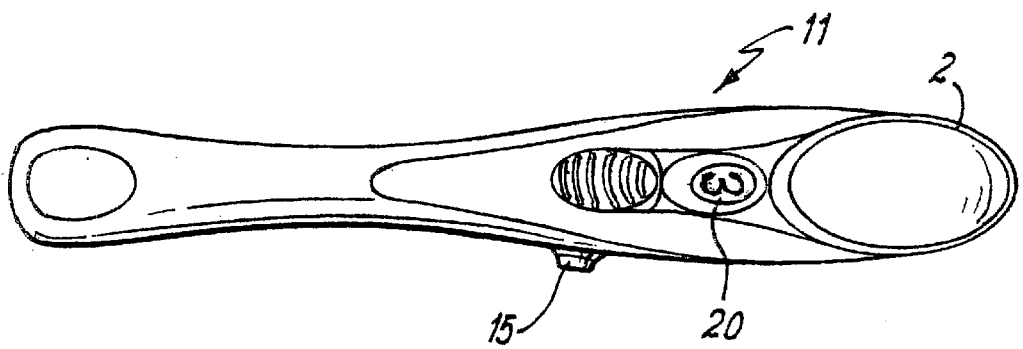
FIG. 3 illustrates a top-view of the measuring device of FIG. 2.
Figure 4A:
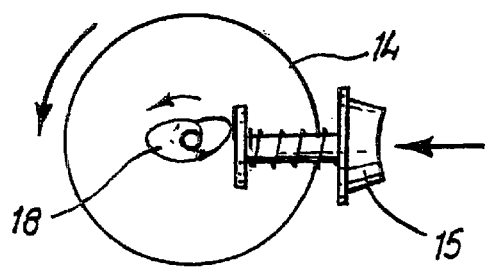
FIGS. 4a and 4b illustrate alternative views of the operation of a zeroing button as used in the embodiment of FIGS. 2 and 3.
Figure 4B:
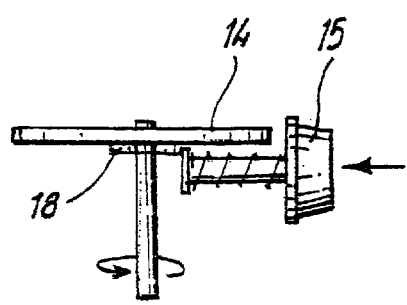

Nevertheless it may be desired to incorporate a counting dial in association with a form of gearing or mechanical advantage that will serve to allow for acceptable levels of movement and size. Such an embodiment of a dispensing device is shown in FIGS. 2 and 3 where a dispensing device 11 comprises a scoop 2, a retractable lid 13 and a counting dial 14. The counting dial 14 may be reset to zero by depressing reset button 15, which may operates in a manner demonstrated by FIG. 4. Various such techniques are common to the resetting of dials, including those used for example on odometers on a motor car's dashboard; such mechanisms being readily available and known to those skilled in the art.

The extremity of the lid 13 is formed with a lip 16 for reasons discussed hereinbefore, namely to provide a face of material to provide a pushing (and not slicing) function through any excess contents in the scoop 2.

FIG. 3 also illustrates a visual display or readout 20 of the counter, wherein the readout is presented on the upper side of the device 11.

Figure 6:
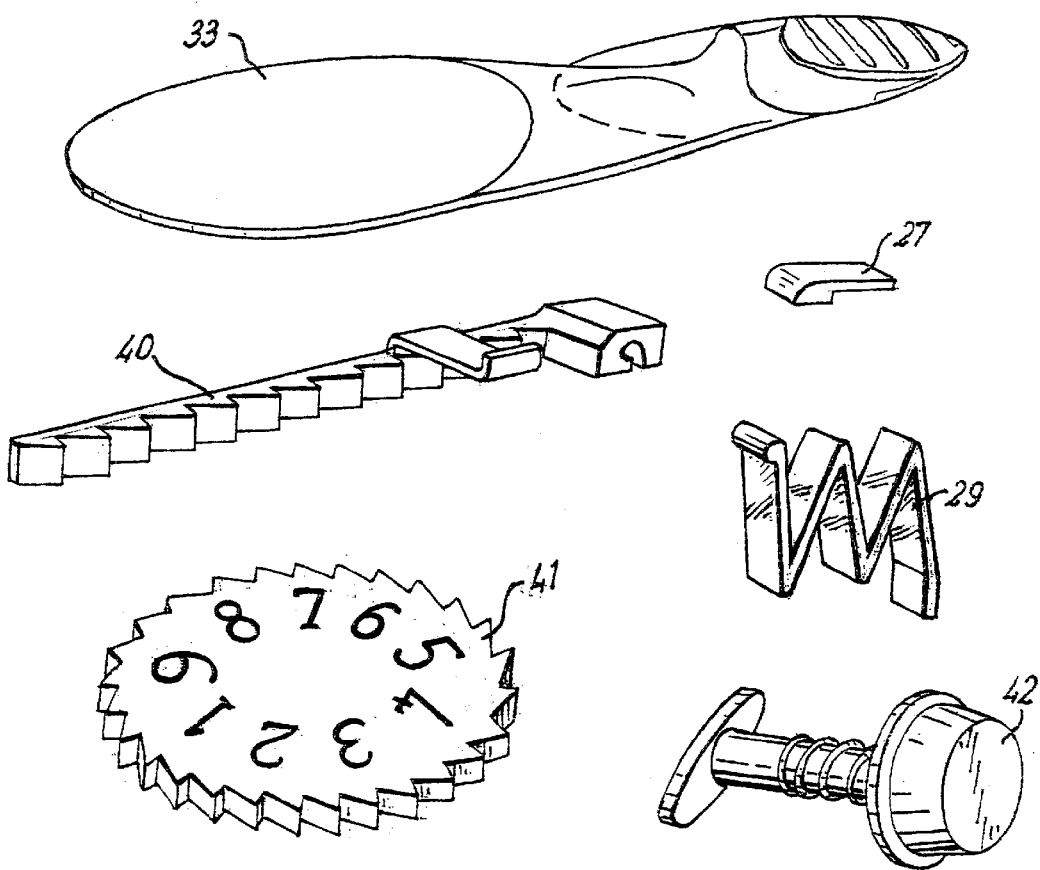
FIG. 6 illustrates the individual parts of an alternative counting mechanism.

As mentioned above, FIGS. 4a and 4b illustrate a top view and a side view of the re-zeroing device of counting dial 14 of FIG. 6. The counting dial 14 is attached to a wedge 18 which turns when the button 15 is depressed. When the button 15 is fully depressed the wedge or cam 18 is forced to a position that corresponds with the re-zeroing of the counting dial 14.

Figure 5:
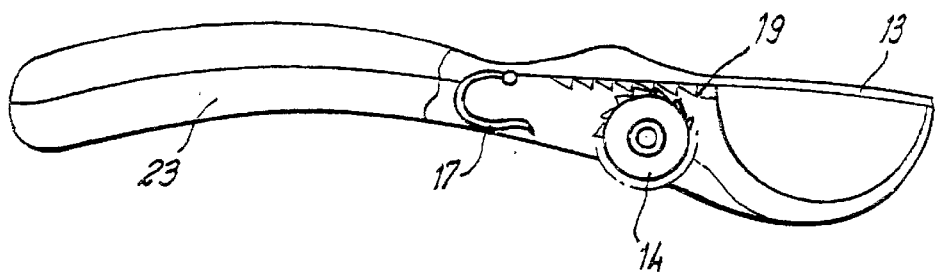
FIG. 5 illustrates a side-view of a dispensing device showing the individual parts of the measuring mechanism.

FIG. 5 illustrates the retractable lid 13, the counting dial 14, the ratchet 19 and the spring 17 of the measuring mechanism in position in a spoon 23.

In FIG. 6 the individual parts of an alternative counting mechanism are illustrated. The levelling means 33 is attached to a ratchet 40. The ratchet 40 is attached to a spring 29, a catch 27 and a counting dial 41. The counting dial 41 is attached to a spring-loaded reset button 42.

Notably, whether a reset button or a resetting arm is used, there is still only a minimal requirement for a user to undertake a single step process in re-zeroing the counter prior to use. This compares favourably with known devices which require the manual direct turning of a counting dial. Furthermore, the present invention has the advantage that simply by fully depressing or extending the resetting mechanism, the counter will return to zero, without the requirement of a user having to line up a dial or scale or provide some form of visual correlation to ensure the counter is back to zero.

It should also be understood that the present invention may be used with powdered materials other than food stuffs, for example washing powder. Moreover the size of the device is not limited by the counting or levelling mechanisms.

A further embodiment provides for the use of sound, for example a click, to record the number of spoonfuls measured.

A further embodiment provides for the spoon to be fitted with an electronic counting mechanism to replace the mechanical counting mechanism.

A further embodiment provides for the measuring mechanism to be in the form of an add on attachment that could be used on unmodified spoons. The measuring mechanism could be fitted prior to use and removed when not required.

Further modifications and improvements may be added without departing from the scope of the invention herein intended.

What is claimed is:

1. A dispensing device for dispensing powder foods or liquids comprising a main body portion, a scoop for containing the powder or liquid, levelling means for levelling off the scoop contents, wherein the levelling means co-operates with a counter such that operation of the levelling means is adapted to advance the counter, wherein the counter includes a visual display of a count taken by the counter, characterised in that the counter may be reset to zero in a single step process.

2. A dispensing device as claimed in claim 1 wherein the single step process involve a single linear movement of a component of the device by the user.

3. A dispensing device as claimed in claim 1 wherein the counter comprises a resetting arm that may be extended from the body of the device, wherein said extending of the arm serves to reset the counter to zero.

4. A dispensing device as claimed in claim 1 wherein the counter comprises a push button that is adapted to reset the counter to zero.

5. A dispensing device as claimed in claim 1 wherein the levelling means comprises an elongate member having a grip or handle at or near one end thereof and a levelling member toward an other end thereof, wherein the levelling means may be moved in a first direction toward the scoop so as to present the levelling member to the contents of the scoop to level said contents, and wherein the levelling means may be moved in a second direction to return the levelling member to a position where it does not obstruct the scoop, and wherein said movement of the levelling means in one of the said first or second direction co-operates with a mechanism to advance the counter, and wherein said movement in the other of the said first or second direction does not advance the counter.

6. A dispensing device as claimed in claim 5 wherein the levelling member is shaped so as to present a face to the contents of the scoop in excess of a predetermined amount, whereby the movement of the face is adapted to push the excess contents away from the scoop.

7. A dispensing device as claimed in claim 5 wherein the mechanism for advancing the counter includes a ratchet.

8. A dispensing device as claimed in claim 1 wherein the visual display of the count may be provided as a two dimensional scale.

9. A dispensing device as claimed in claim 1 wherein the distance moved by the levelling means to perform a levelling function in respect of the scoop is greater than the distance of movement of the visual display apparatus when advancing by a single unit.

10. A dispensing device as claimed in claim 5 wherein the levelling member is selectively adapted to cover the scoop and has a means for sealingly engaging an upper rim of the scoop for use when dispensing liquids.

11. A dispensing device as claimed in claim 1 which may be dismantled and reassembled to aid in cleaning requirements.

12. A dispensing device as claimed in claim 1 wherein the visual display of the count is positioned for viewing from an upper side of the device, wherein said upper side is defined by the open side of the scoop.

* * * * *

UNITED STATES PATENT AND TRADEMARK OFFICE
CERTIFICATE OF CORRECTION

PATENT NO. : 6,404,838 B1  Page 1 of 1
DATED : June 11, 2002
INVENTOR(S) : Kirsty Hall It is certified that error appears in the above-identified patent and that said Letters Patent is hereby corrected as shown below:

<u>Title page,</u>
Item [73], Assignee, please remove "Kennedy & Co. Glasgow (GB)".

Signed and Sealed this

Twenty-ninth Day of October, 2002

Attest:

JAMES E. ROGAN
Attesting Officer   Director of the United States Patent and Trademark Office